US012577051B1

(12) United States Patent
Vinciguerra

(10) Patent No.: US 12,577,051 B1
(45) Date of Patent: Mar. 17, 2026

(54) HINGE-MOUNTABLE HANDLE ASSEMBLY

(71) Applicant: Mark T. Vinciguerra, Hobe Sound, FL (US)

(72) Inventor: Mark T. Vinciguerra, Hobe Sound, FL (US)

( * ) Notice: Subject to any disclaimer, the term of this patent is extended or adjusted under 35 U.S.C. 154(b) by 0 days.

(21) Appl. No.: 19/281,200

(22) Filed: Jul. 25, 2025

(51) Int. Cl.
B65G 7/12 (2006.01)
(52) U.S. Cl.
CPC ...................................... B65G 7/12 (2013.01)
(58) Field of Classification Search
CPC .............. B65G 7/12; A45C 13/28; B66C 1/14
USPC .......................................................... 294/137
See application file for complete search history.

(56) References Cited

U.S. PATENT DOCUMENTS

| | | | | |
|---|---|---|---|---|
| 3,150,895 | A * | 9/1964 | Lèbre ..................... | B23Q 7/043 269/228 |
| 3,169,034 | A * | 2/1965 | Epstein ..................... | B65G 7/12 29/268 |
| 5,211,436 | A | 5/1993 | Feder | |
| 5,484,182 | A * | 1/1996 | Meisner ..................... | A45F 5/10 294/169 |
| 5,509,708 | A * | 4/1996 | Nathan ................. | A45F 5/1046 294/170 |
| 5,511,285 | A * | 4/1996 | Bush ........................ | B65G 7/12 294/170 |
| 5,904,388 | A * | 5/1999 | Seibel .................... | A45C 13/28 294/169 |
| D436,036 | S * | 1/2001 | Manseau ........................ | D9/434 |
| 6,865,777 | B2 * | 3/2005 | Comstock ............ | A45C 13/262 16/446 |
| 7,571,946 | B2 * | 8/2009 | Jenkins ................. | A45F 5/1026 294/159 |
| 2014/0265384 | A1 * | 9/2014 | Weber, Sr. ............... | B65G 7/12 294/16 |
| 2016/0311619 | A1 * | 10/2016 | Gieseke, Sr. ........ | B65G 49/061 |

FOREIGN PATENT DOCUMENTS

| | | |
|---|---|---|
| DE | 650528 C | 9/1937 |
| DE | 834343 C | 3/1952 |
| DE | 29518085 U1 | 1/1996 |
| DE | 20108916 U1 | 5/2001 |

* cited by examiner

*Primary Examiner* — Paul T Chin
(74) *Attorney, Agent, or Firm* — John Rizvi; John Rizvi, P.A.—The Patent Professor®

(57) ABSTRACT

A handle assembly, mountable to a door assembly or another structure to facilitate carrying the structure, includes a main body having one or more grip portions and one or more hinge-receiving cavities. Each hinge-receiving cavity is elongately formed and configured to receive and retain a hinge barrel portion of a hinge of the structure. The handle assembly may adopt a working configuration in which the main body is mounted to the hinge of the structure by the hinge barrel portion being received and retained within a hinge-receiving cavity, and in which a grip portion is arranged outside and spaced apart from the structure allowing a hand of a user to grasp the grip portion and manually lift the structure via the handle assembly.

17 Claims, 12 Drawing Sheets

HINGE-MOUNTABLE HANDLE ASSEMBLY

FIELD OF THE INVENTION

The present invention relates generally to door and window transportation systems, and more specifically, to a handle assembly which is disconnectably attachable to a hinge of a door or window to facilitate manually lifting and carrying the door or window.

BACKGROUND OF THE INVENTION

Door assemblies—which typically include one or more door panels pre-fitted within door jambs—are standard components in the construction of residential, commercial, and industrial buildings. These assemblies often feature added hardware such as hinges, thresholds, weather stripping, and locksets, and may include decorative elements or glass inserts. As a result, they are frequently large, heavy, and unbalanced in shape and weight.

In a variety of settings, including door manufacturing plants, warehousing facilities, delivery operations, and construction sites, workers are commonly required to move door assemblies manually. These handling tasks occur at multiple stages of the product's lifecycle—ranging from assembly line transitions and packaging, to loading for transport, and ultimately, to final placement and installation at the job site. Manual lifting remains a common practice, especially for custom orders, small-batch runs, or installations in environments that lack mechanical lifting equipment.

However, due to the size and mass of most door assemblies, manual handling presents significant ergonomic and logistical challenges. A typical door assembly is not only heavy, but also has a long and flat form factor that lacks built-in grip points. This makes it difficult for a single person to lift and carry safely and efficiently. Even two-person lifts can be difficult to coordinate, particularly when trying to avoid contact with delicate surfaces, pre-finished edges, or protruding hardware.

The difficulty is further compounded by the fact that door assemblies often must be carried through narrow hallways, up stairs, or into unfinished spaces where ground conditions are uneven or access is limited. During these movements, the risk of dropping, damaging, or misaligning the door is substantial. Even in warehouse or shop-floor settings, lifting doors off of pallets or support racks frequently requires awkward postures and unstable grips. These factors increase the physical strain on workers and contribute to a higher incidence of workplace injuries.

Additionally, the irregular weight distribution of door assemblies, particularly pre-hung doors or those with embedded glass, can cause imbalance during lifting and transport. This imbalance increases the difficulty of maintaining proper orientation and stability, particularly when doors must be moved vertically or rotated during positioning. Workers may resort to makeshift methods—such as wrapping straps around the unit or wedging their hands between the jamb and the panel—many of which are unsafe or unreliable in practice.

Although a variety of general-purpose material handling aids exist, such as hand trucks, lifting straps, and dollies, these are often not optimized for the unique form factor and handling requirements of door assemblies. Some devices require flat or uniform surfaces to function properly; others necessitate time-consuming adjustments or setups that interrupt workflow. In many cases, these tools are too large or rigid to be used effectively in tight spaces or on irregular terrain, which limits their utility on actual job sites.

Injuries resulting from repetitive lifting or improper handling of heavy building components are a persistent issue in the construction and manufacturing industries. Workers may experience back strain, shoulder fatigue, wrist injuries, and other musculoskeletal problems due to the physical demands of lifting doors without adequate support. In addition to safety concerns, these challenges can also reduce productivity, increase labor costs, and lead to damaged products.

Accordingly, there remains a need in the industry for improved ways to facilitate the manual handling of door assemblies. In particular, there is a need for practical, field-adaptable solutions that assist personnel in lifting and carrying door assemblies in a safer and more ergonomic manner, without requiring substantial equipment or complicated procedures.

SUMMARY OF THE INVENTION

The present invention is directed to a handle assembly, mountable to a door assembly or another structure to facilitate carrying the structure. The handle assembly may include a main body having one or more grip portions and one or more hinge-receiving cavities. Each hinge-receiving cavity may be elongately formed and configured to receive and retain a hinge barrel portion of a hinge of the structure. The handle assembly may adopt a working configuration in which the main body is mounted to the hinge of the structure by the hinge barrel portion being received and retained within a hinge-receiving cavity, and in which a grip portion is arranged outside and spaced apart from the structure allowing a hand of a user to grasp the grip portion and manually lift the structure via the handle assembly. The handle assembly may constitute a cost-effective and time-saving solution for manually carrying door assemblies, window assemblies, or other structures including one or more hinges. In a preferred embodiment, two or more separate (or individual) handle assemblies as disclosed herein may be mounted to two or more hinges of the structure, respectively, to facilitate carrying the structure by one or more operators grasping and lifting the structure from the two or more handle assemblies.

In a first implementation of the invention, a handle assembly, mountable to a structure to facilitate carrying the structure, may include a main body. The main body may include one or more grip portions and one or more hinge-receiving cavities. Each hinge-receiving cavity may be elongately formed and configured to receive and retain a hinge barrel portion of a hinge of the structure. The handle assembly may be configured to adopt a working configuration in which the main body is mounted to the hinge of the structure by the hinge barrel portion being received and retained within a hinge-receiving cavity of the one or more hinge-receiving cavities. In the working configuration, a grip portion of the one or more grip portions may be arranged outside and spaced apart from the structure enabling a gripping thereonto by a hand of a user to manually lift the structure via the handle assembly.

In a second aspect, each hinge-receiving cavity of the one or more hinge-receiving cavities may be configured to slidably receive the hinge barrel portion.

In another aspect, in the working configuration of the handle assembly, the grip portion may be located above the hinge-receiving cavity.

In another aspect, in the working configuration of the handle assembly, the main body may abut against the structure to stabilize the main body with respect to the structure.

In yet another aspect, the main body may include a first body portion and a second body portion. The first and second body portions may be movable with respect to one another. In the working configuration, one of the first and second body portions may include the hinge-receiving cavity and the other of the first and second body portions may include the grip portion. In the working configuration of the handle assembly, a position of the grip portion relative to the hinge-receiving cavity may be adjustable by moving the second body portion relative to the first body portion.

In another aspect, the first and second body portions may be pivotable with respect to one another about a pivot axis.

In another aspect, in the working configuration of the handle assembly, the other of the first and second body portions may be arranged in an upward-pivoted position, and the one of the first and second body portions may block the other of the first and second body portions from pivoting further towards the structure.

In another aspect, the one or more hinge-receiving cavities may consist of two or more hinge-receiving cavities, and the one or more grip portions may consist of two or more grip portions. Said one of the first and second body portions may include another hinge-receiving cavity and said other of the first and second body portions may include another grip portion.

In yet another aspect, the two or more hinge-receiving cavities may be elongately formed along respective, longitudinal directions which may be parallel to one another.

In another aspect, the hinge-receiving cavity of the first body portion may extend through the grip portion of the first body portion, and the hinge-receiving cavity of the second body portion may extend through the grip portion of the second body portion.

In another aspect, the hinge-receiving cavities of the first and second body portions and the grip portions of the first and second body portions may be generally parallel.

In another aspect, each hinge-receiving cavity of the two or more hinge-receiving cavities may include a respective, end opening granting access to the hinge-receiving cavity. The end openings of the two or more hinge-receiving cavities may be arranged on a same side of the main body of the handle assembly.

In yet another aspect, the one or more hinge-receiving cavities comprise may include or more hinge-receiving cavities having different, respective geometries configured to receive and retain respective, differently-configured hinges.

In another aspect, the different, respective geometries may be configured for receiving and retaining respective, differently-sized hinges.

In another aspect, the different, respective geometries may be configured for receiving and retaining respective hinge barrel portions having a different diameter with respect to one another.

In another aspect, the main body may be integrally-formed into a single-piece unit.

In yet another aspect, in the working configuration of the handle assembly, the hinge-receiving cavity of the one or more hinge-receiving cavities may be parallel to the grip portion of the one or more grip portions.

In another aspect, in the working configuration of the handle assembly, the hinge-receiving cavity of the one or more hinge-receiving cavities may be perpendicular to the grip portion of the one or more grip portions.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a handle assembly attachable to a hinge of a structure such as, but not limited to, a window or door assembly, to facilitate manual lifting and transport of the structure. Shown throughout the drawings are several embodiments of the invention, which are intended to be illustrative and not to limit the scope of the invention, which is defined by the appended claims.

Figure 1:
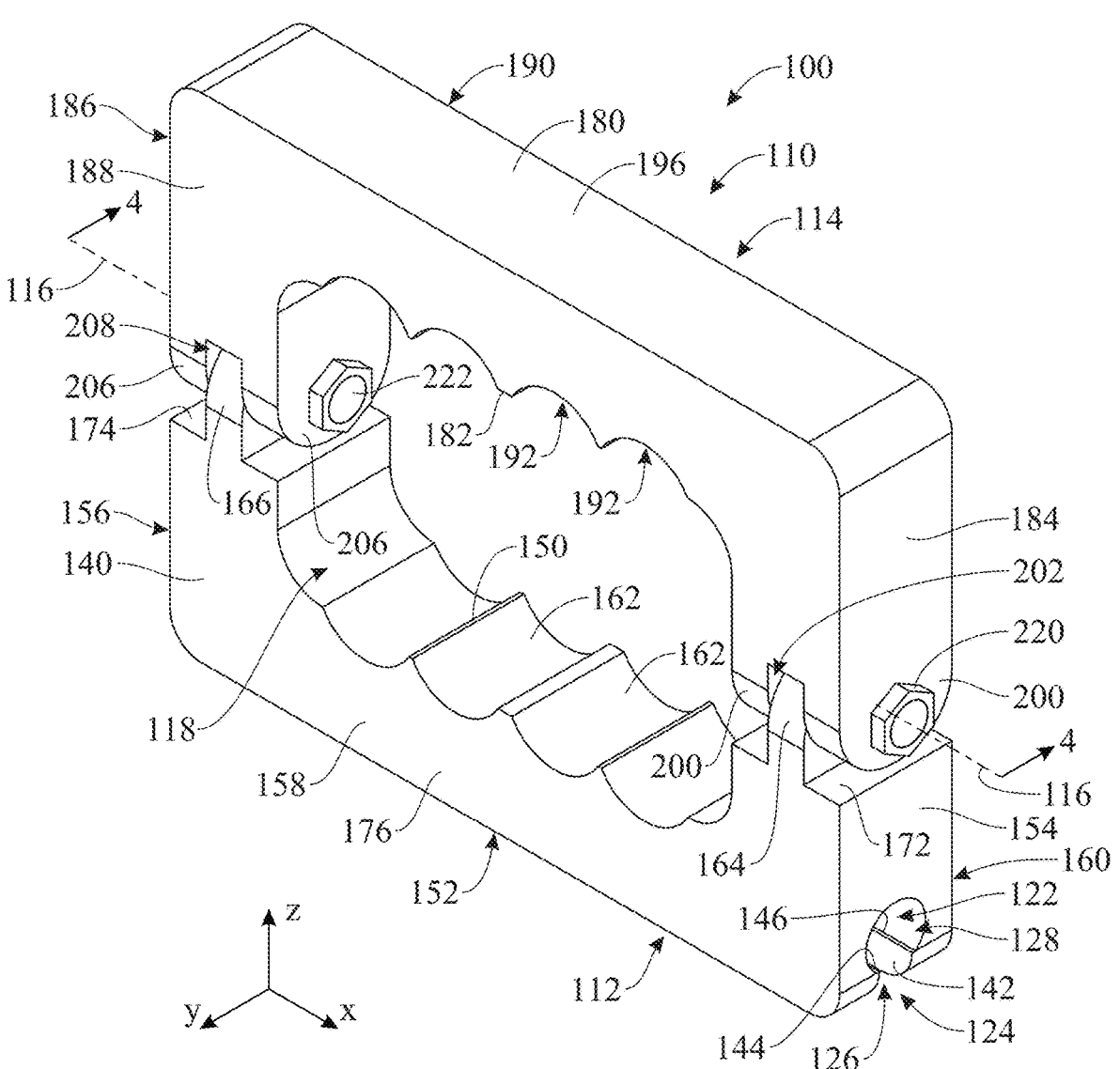
FIG. 1 presents a top front, left side isometric view of a handle assembly in accordance with a first illustrative embodiment of the present invention.
Figure 7:
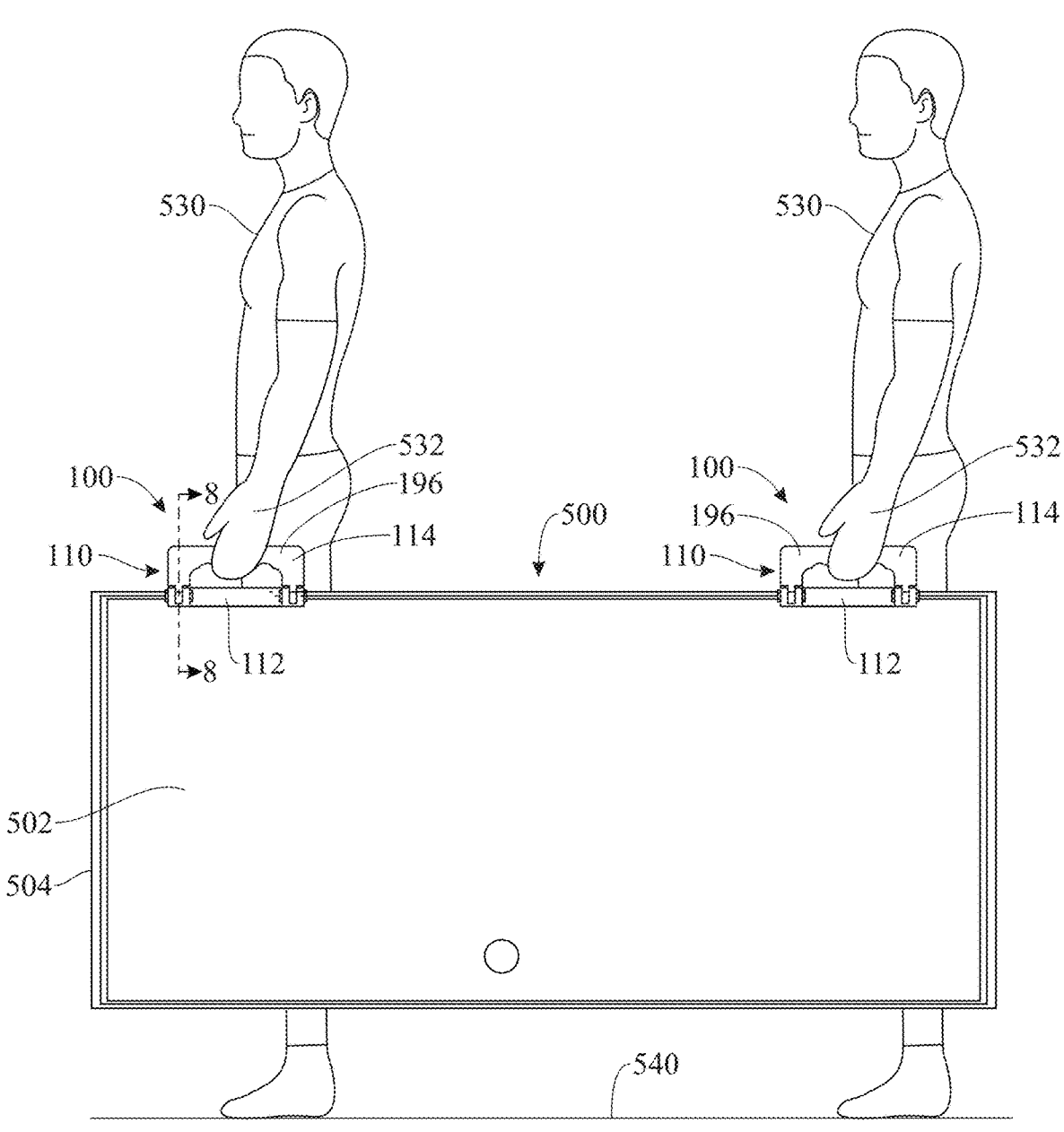
FIG. 7 presents a side elevation view of a pair of handle assemblies of FIG. 1 shown attached to a structure and being grasped by two operators to carry the structure.
Figure 8:
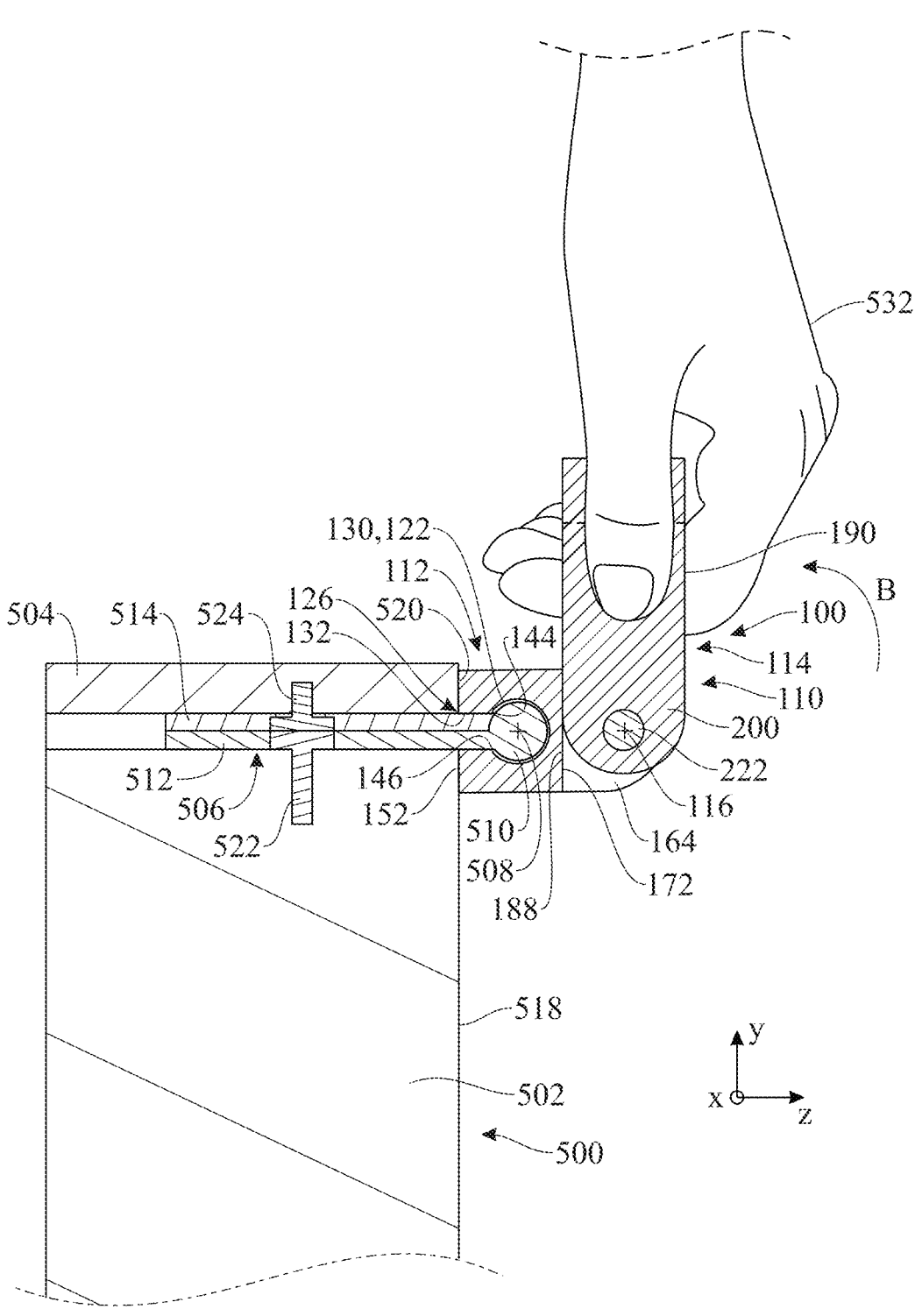
FIG. 8 presents a partial, cross-sectional front elevation view of one of the handle assemblies and a top area of the structure of FIG. 7, the cross-section taken along section plane 8-8 indicated in FIG. 7.
Figure 12:
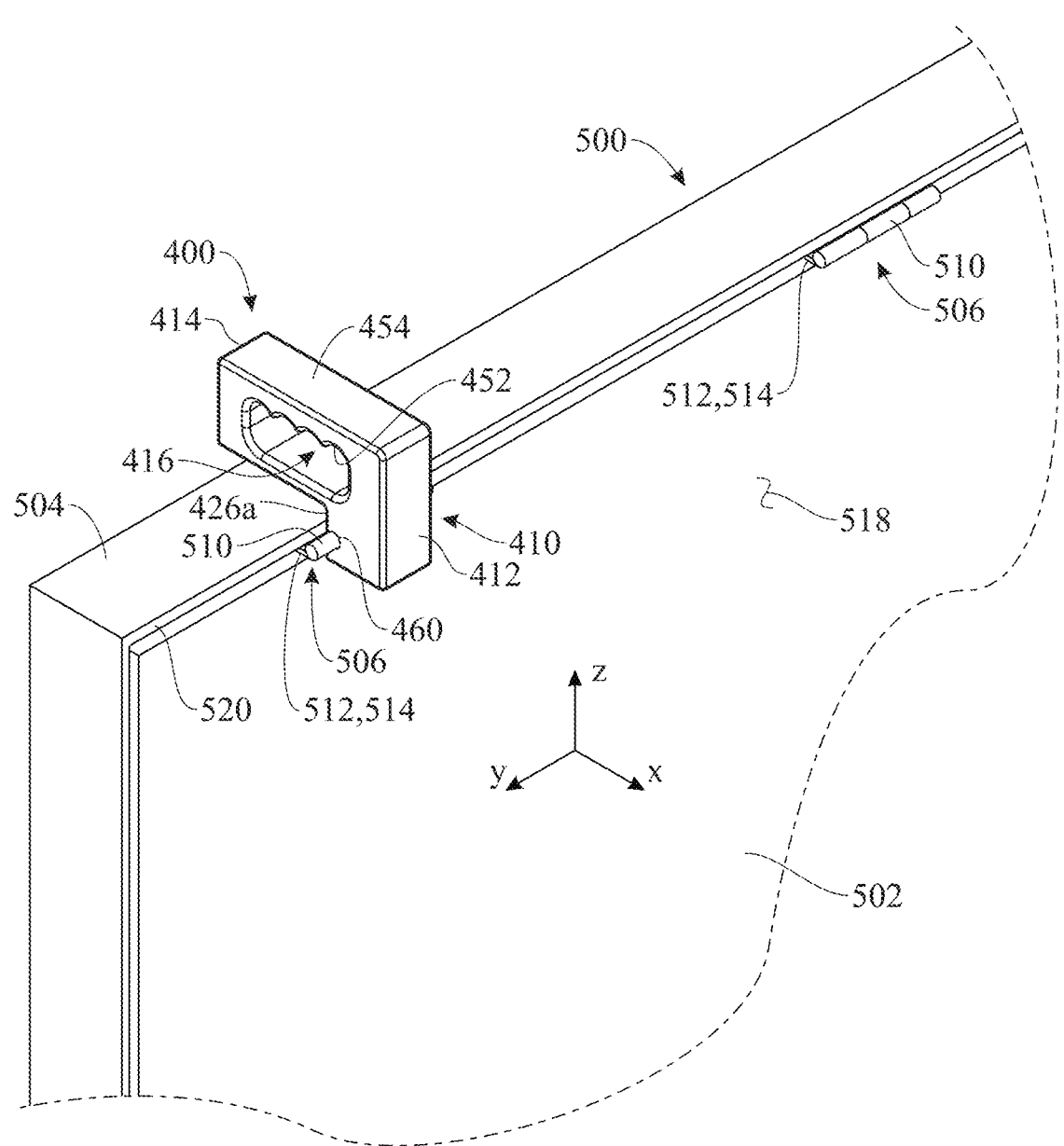
FIG. 12 presents an isometric view of the handle assembly of FIG. 10 shown attached to a hinge of the structure.

Referring initially to FIG. 1, a handle assembly 100 is shown in accordance with a first illustrative embodiment of the present invention. The handle assembly 100 may be used to carry a structure such as, but not limited to, a window or door assembly. An illustrative structure 500 is shown in FIGS. 7-8, and further shown in FIG. 12. The structure 500 may include at least one leaf or panel 502 and a jamb 504, wherein the panel 502 is pivotably connected to the jamb 504 via one or more hinges 506 defining a rotation axis 508. The panel 502 is rotatable about the rotation axis 508, and with respect to the jamb 504, between an open position and a closed position. Each hinge typically includes a barrel portion 510 which may pivotably connect a pair of hinge plates 512 and 514 to one another about the rotation axis 508. The first and second hinge plates 512 and 514 may be attached to the panel 502 and the jamb 504 by fasteners 522 and 524 (FIG. 8), respectively. The first hinge plate 512 carries the panel 502 and rotates jointly with the panel 502 with respect to the second hinge plate 415—and the attached jamb 504—about the rotation axis 508. As best shown in FIGS. 8 and 12, when the panel 502 is arranged in the closed position, the barrel portion 510 may protrude outwardly of the panel 502 and jamb 504. It should be noted, however, that alternative door assemblies may be used in conjunction with the present invention; for instance, the present invention may be used to carry a structure (e.g., door or window assembly) consisting of a jamb and one or more hinges attached thereto (the structure thus lacking the panel 502), or consisting of one or more panels and one or more attached hinges (the structure thus lacking a jamb 504).

Referring again to FIG. 1, the handle assembly 100 may include a main body 110. The main body 110 may include one or more body portions fixedly or movably positioned with respect to one another. For instance, the main body 110 of the present embodiment includes a first body portion 112 and a second body portion 114 pivotably attached to one another about a pivot axis 116. The handle assembly 100 may be three-dimensionally formed along a front-to-back or longitudinal direction x, a left-to-right or transverse direction y, and a vertical direction z, wherein directions x, y, z form an orthogonal axis set. In the present embodiment, the pivot axis 116 is arranged in the longitudinal direction x.

Figure 2:
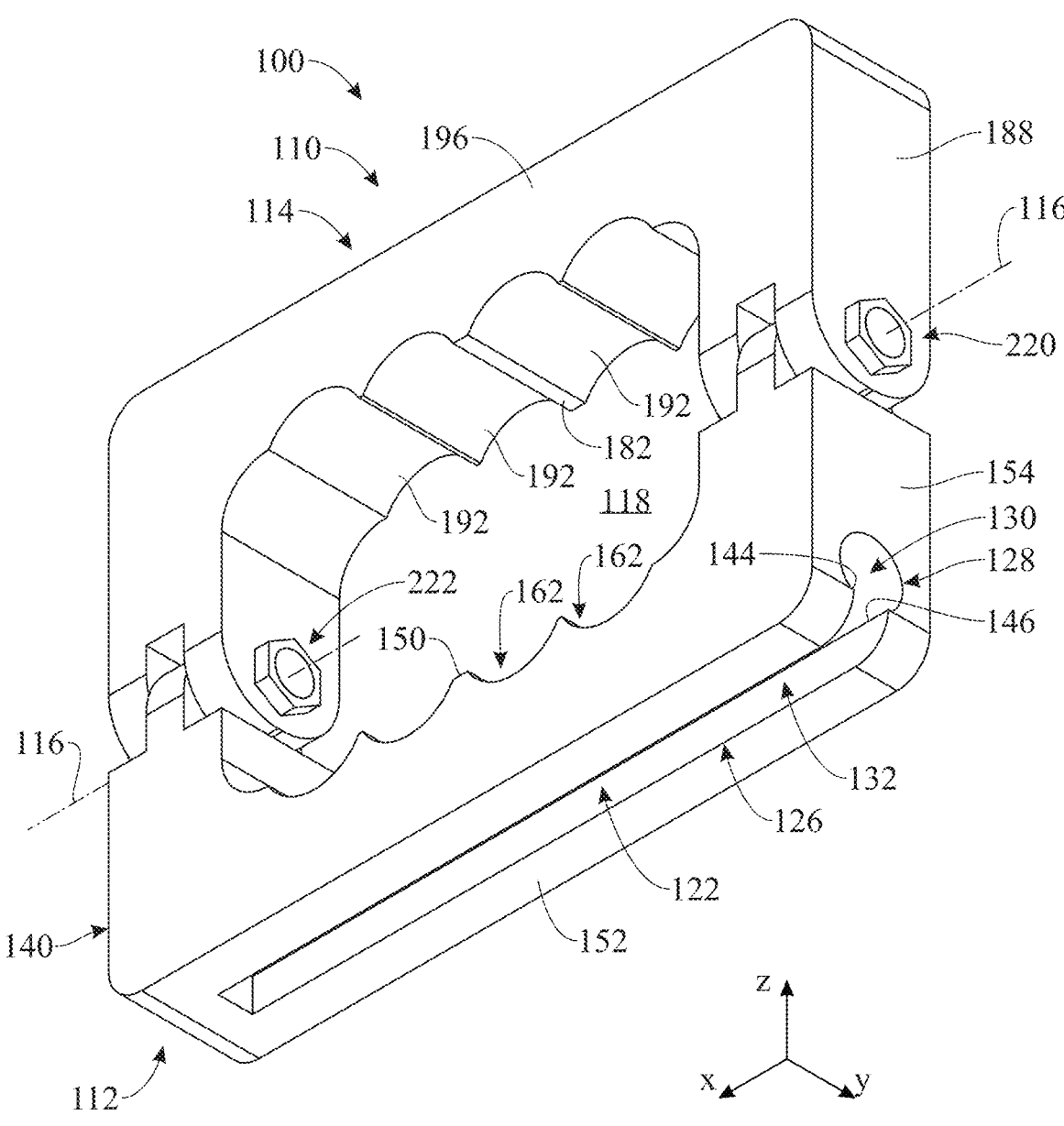
FIG. 2 presents a bottom front, left side isometric view of the handle assembly of FIG. 1.
Figure 4:
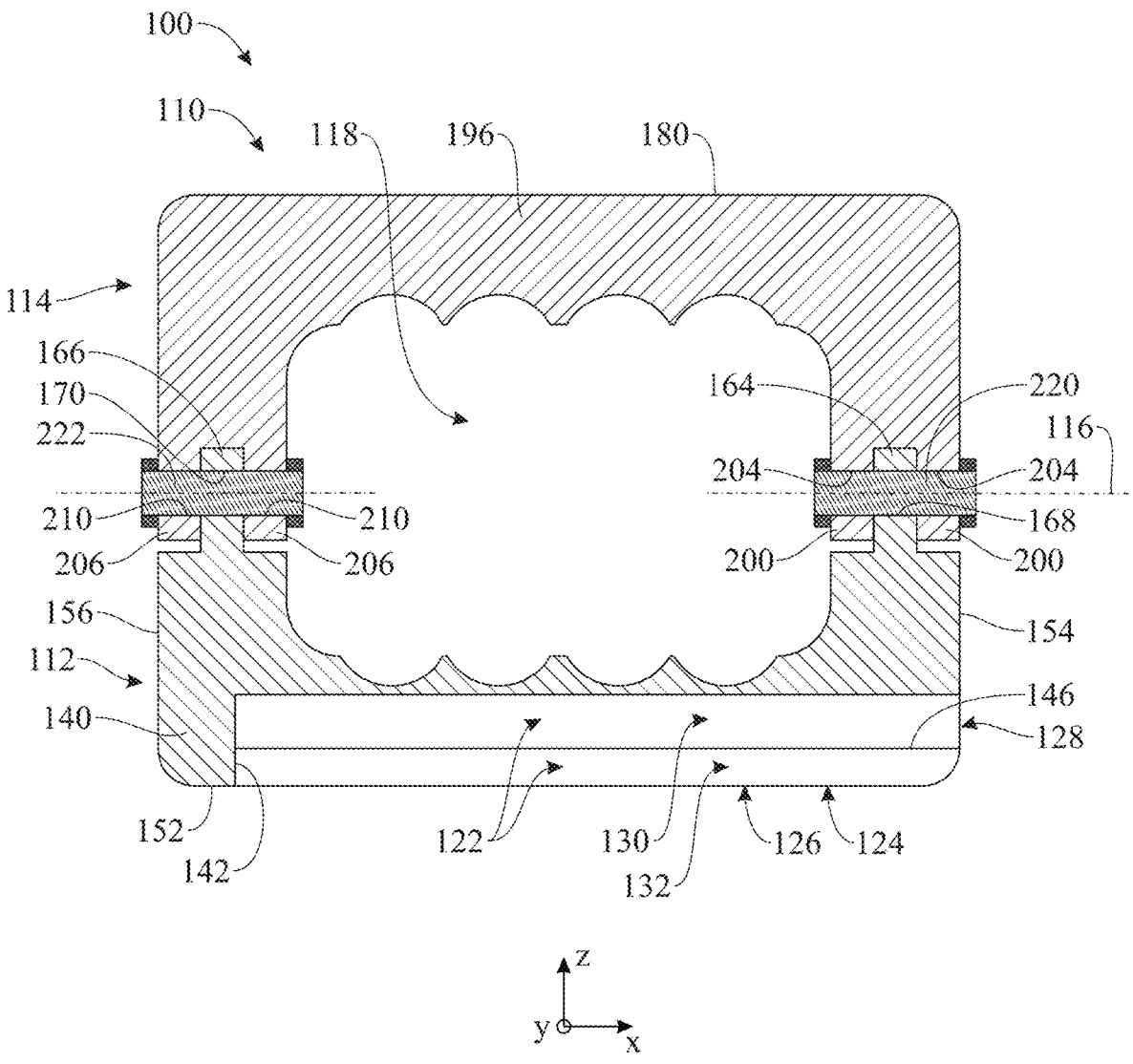
FIG. 4 presents a cross-sectional, left side elevation view of the handle assembly of FIG. 1, the cross-section taken along section plane 4-4 indicated in FIG. 1.

As shown in FIGS. 1, 2 and 4, the first body portion 112 includes a hinge-receiving cavity 122. The hinge-receiving cavity 122 may be elongately formed along the longitudinal direction x and may end in an access opening 124. The access opening 124 may be formed by a longitudinal opening 126 and an end opening 128 arranged at an angle with one another and in communication with one another. The end opening 128 may be arranged at a front or first end of the hinge-receiving cavity 122 along the longitudinal direction x. In preferred embodiments, an opposite rear or second end of the hinge-receiving cavity 122 (opposite to the front end at which the end opening 128 is located) may be at least partially closed to prevent the hinge 506 from sliding longitudinally out of the hinge-receiving cavity 122; for instance, as best shown in FIG. 4, the rear end of the hinge-receiving cavity 122 of the present embodiment is fully closed by a wall 140 of the first body portion 112.

With continued reference to FIGS. 2 and 4, the hinge-receiving cavity 122 may include a first space 130 and a second space 132 arranged extending from one another. The end opening 128 allows access to the first and second spaces 130 and 132, while the longitudinal opening 126 may grant access to the second space 132. The first space 130 may be shaped and sized to slidably receive the barrel portion 510 of the hinge 506; in a non-limiting example, the first space 130 may be generally cylindrical. The second space 132, in turn, may be shaped and sized to slidably receive the first and second hinge plates 512 and 514, while being sufficiently small (narrow) to prevent the barrel portion 510 of the hinge 506 from passing therethrough; in a non-limiting example, the second space 132 may be generally flat and rectangular, having a width (dimension in the transverse direction y) smaller than the width (e.g., diameter) of the first space 130 and smaller than the diameter of the barrel portion 510 of the hinge 506. An inner wall 142 of the first body portion 112 may define the first and second spaces 130, 132. In the area in which the wider, first space 130 transitions into the narrower, second space 132, the inner wall 142 may include shoulders 144 and 146 arranged in spaced-apart relationship and facing one another.

Figure 3:
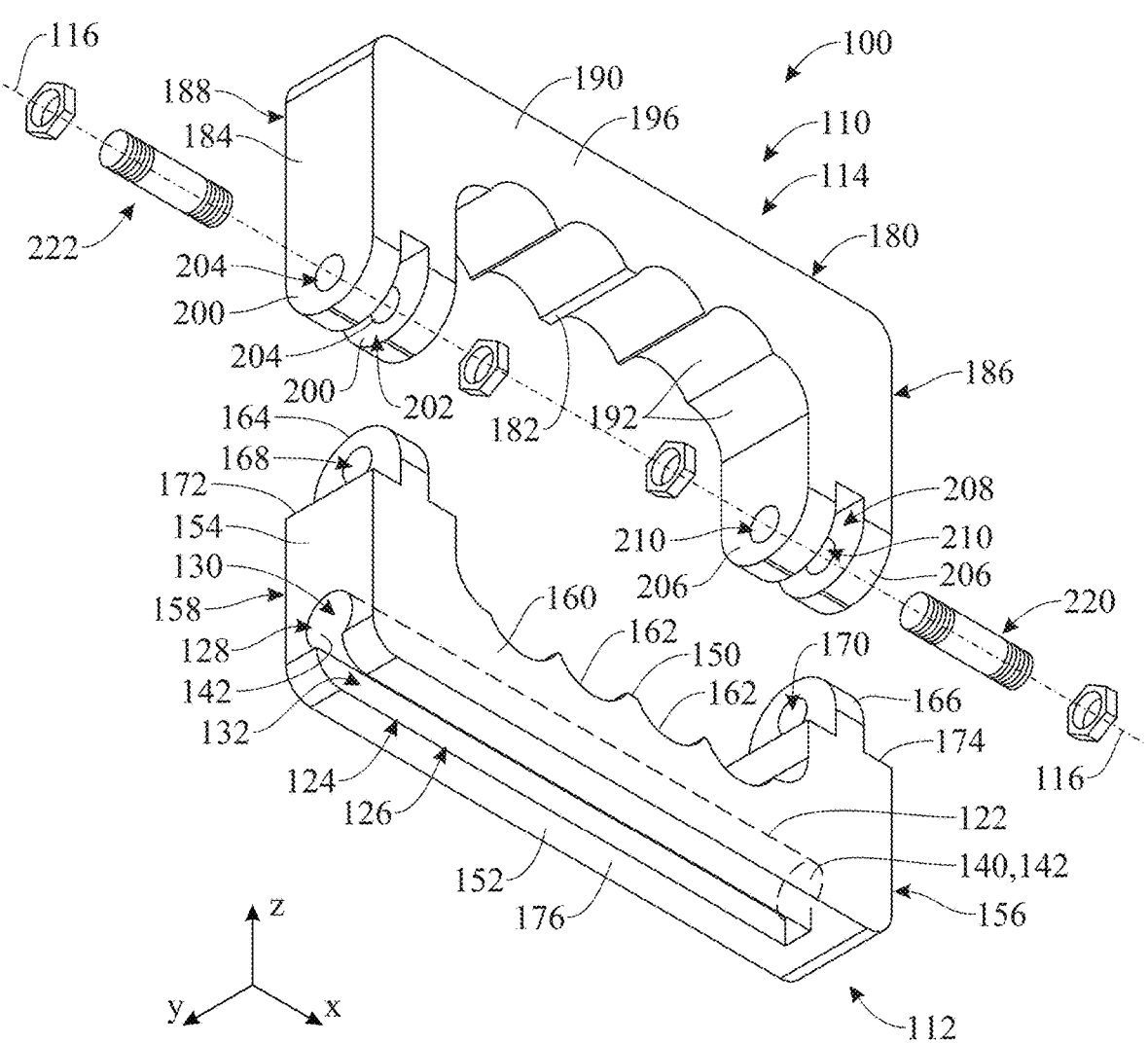
FIG. 3 presents an exploded, bottom front, right side isometric view of the handle assembly of FIG. 1.

As shown in FIGS. 1-3, the first body portion 112 may have one or more outer sides or surfaces, such as a top side 150, a bottom side 152, a front side 154, a rear side 156, a left side 158 and a right side 160. In one embodiment, the top side 150 may be provided with one or more finger recesses 162, and more preferably, a plurality of finger recesses 162, facilitating a user ergonomically wrapping his or her fingers around the first body portion 112 in the event of grasping the first body portion 112. Alternatively or additionally, the bottom side 152 may be generally flat or otherwise configured to stably rest on a flat horizontal surface, such as to rest the handle assembly 100 thereon. The longitudinal opening 126 may extend along the bottom side 152, and the end opening 128 may extend along the front side 154. In turn, the wall 140—which closes the rear end of the hinge-receiving cavity 122—may include the rear side 156.

As further shown, a pair of flanges 164 and 166 may extend upward from the top side 150 of the first body portion 112. Each flange 164, 166 may include a respective through bore 168, 170 extending longitudinally through the flange 164, 166. In some embodiments, the flanges 164 and 166 may extend from opposite end sections 172 and 174 of the top side 150 which are elevated with respect to the relatively lower, finger recesses 162; for instance and without limitation, the first body portion 112 may be generally C-shaped, as shown. In some embodiments, the end sections 172 and 174 of the top side 150 may be generally flat and preferably coplanar with each other. An intermediate portion of the first body portion 112, hereinafter referred to as first grip portion 176, may be arranged between the elevated sides of the first body portion 112, and may include the aforementioned finger recesses 162. In some embodiments, the first grip portion 176 may be elongately formed, such as along the longitudinal direction x as shown.

With continued reference to FIGS. 1-3, the second body portion 114 may include a top side 180, a bottom side 182, a front side 184, a rear side 186, a left side 188, and a right side 190. The top side 180 may be generally flat or otherwise configured to stably rest on a flat horizontal surface. At an intermediate section of the second body portion 114—said intermediate section hereinafter referred to as second grip portion 196—the bottom side 182 may include one or more, and more preferably, a plurality of finger recesses 192 recessed thereinto. In turn, front and rear ends of the second body portion 114 may extend from the intermediate section forming a C-shaped configuration. At the front end, the second body portion 114 may include a first pair of flanges 200 arranged in spaced-apart relationship such that a space 202 is defined therebetween, the flanges 200 including respective through bores 204 arranged in longitudinal (axial) alignment with one another. The space 202 is shaped and sized to rotationally receive the front flange 164 of the first body portion 112 such that the through bore 168 of the front flange 164 axially aligns with the through bores 204 of the first pair of flanges 200. Similarly, the rear end of the second body portion 114 may include a second pair of spaced-apart flanges 206 defining a space 208 therebetween, the flanges 206 including respective through bores 210 arranged in axial alignment and further axially aligned with the through bores 204 of the first pair of flanges 200. The space 208 is shaped and sized to rotationally receive the rear flange 166 of the first body portion 112 such that the through bore 168 of the front flange 166 axially aligns with the through bores 210 of the second pair of flanges 206.

As heretofore described, the first and second body portions 112 and 114 may be pivotably attached to one another. For instance, a pair of threaded bolt-and-nut fasteners 220, 222 may pivotally connect the first and second body portions 112 and 114 at the front and rear ends thereof, respectively. More specifically, as shown in FIGS. 1, 2 and 4, a first bolt-and-nut fastener 220 may extend through the aligned through bores 168 and 204 of the front flange 164 and the first pair of flanges 200, respectively. In turn, a second bolt-and-nut fastener 222 may extend through the aligned through bores 170 and 210 of the rear flange 166 and the second pair of flanges 206, respectively. The bolt-and-nut fasteners 220, 222 may be axially aligned, defining the pivot axis 116 and allowing the first and second body portions 112 and 114 to rotate with respect to one another about the pivot axis 116.

Referring again to FIGS. 1, 2 and 4, as shown, the second grip portion 196 of the second body portion 112 is arranged in spaced-apart relationship with the elongated, hinge-receiving cavity 122. More specifically, the hinge-receiving cavity 122 is formed within the first body portion 112, which in turn is separated from the second grip portion 196 of the second body portion 114 by a space 118. The space 118 is defined between the intermediate or first grip portion 176 of the first body portion 112 and the intermediate or second grip portion 196 of the second body portion 114.

Figure 5:
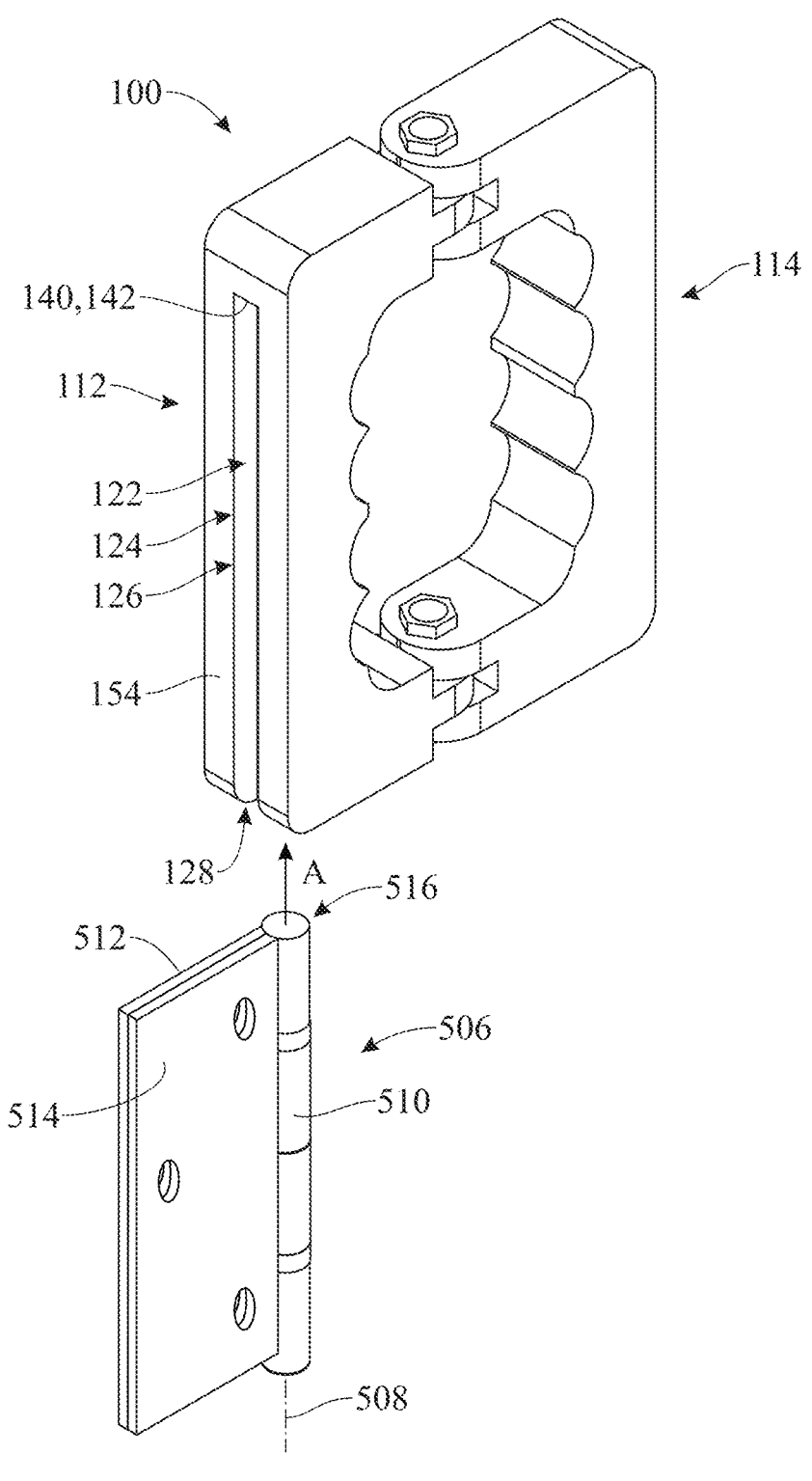
FIG. 5 presents an isometric view of the handle assembly of FIG. 1 being mounted to a hinge.

An illustrative method of operation of the handle assembly 100 is now described with reference initially to FIGS. 5 and 12. As heretofore described, the need may arise to manually carry a structure 500 of a type which includes one or more attached hinges 506. Via the present invention, the one or more attached hinges 506, and more specifically, the protruding hinge portions 510, may be used as anchor points to which one or more handle assemblies 100 may be attached. More specifically, turning to FIG. 5, the first body portion 112 of the main body 110 of each handle assembly 100 may be secured to the protruding hinge barrel portion 510 by sliding the hinge barrel portion 510 and adjacent sections of the first and second hinge plates 512 and 514 into the end opening 128 of the handle assembly 100, as indicated by arrow A. The operator may proceed to slide the handle assembly 100 over the hinge barrel portion 510, causing the hinge barrel portion 510 to slide along the first space 130 (FIG. 4) of the hinge-receiving cavity 122 and the first and second hinge plates 512 and 514 to slide along the second space 132 (FIG. 4) of the hinge-receiving cavity 122. As the hinge 506 slides into the hinge-receiving cavity 122, the first and second shoulders 144 and 146 retain the barrel portion 510 of the hinge 506 within the first space 130 thereby preventing the hinge 506 from sliding out of the hinge-receiving cavity 122 through the longitudinal opening 126; such blocking of the hinge barrel portion 510 by the shoulders 144 and 146 may be appreciated, for instance, in FIG. 8.

Figure 6:
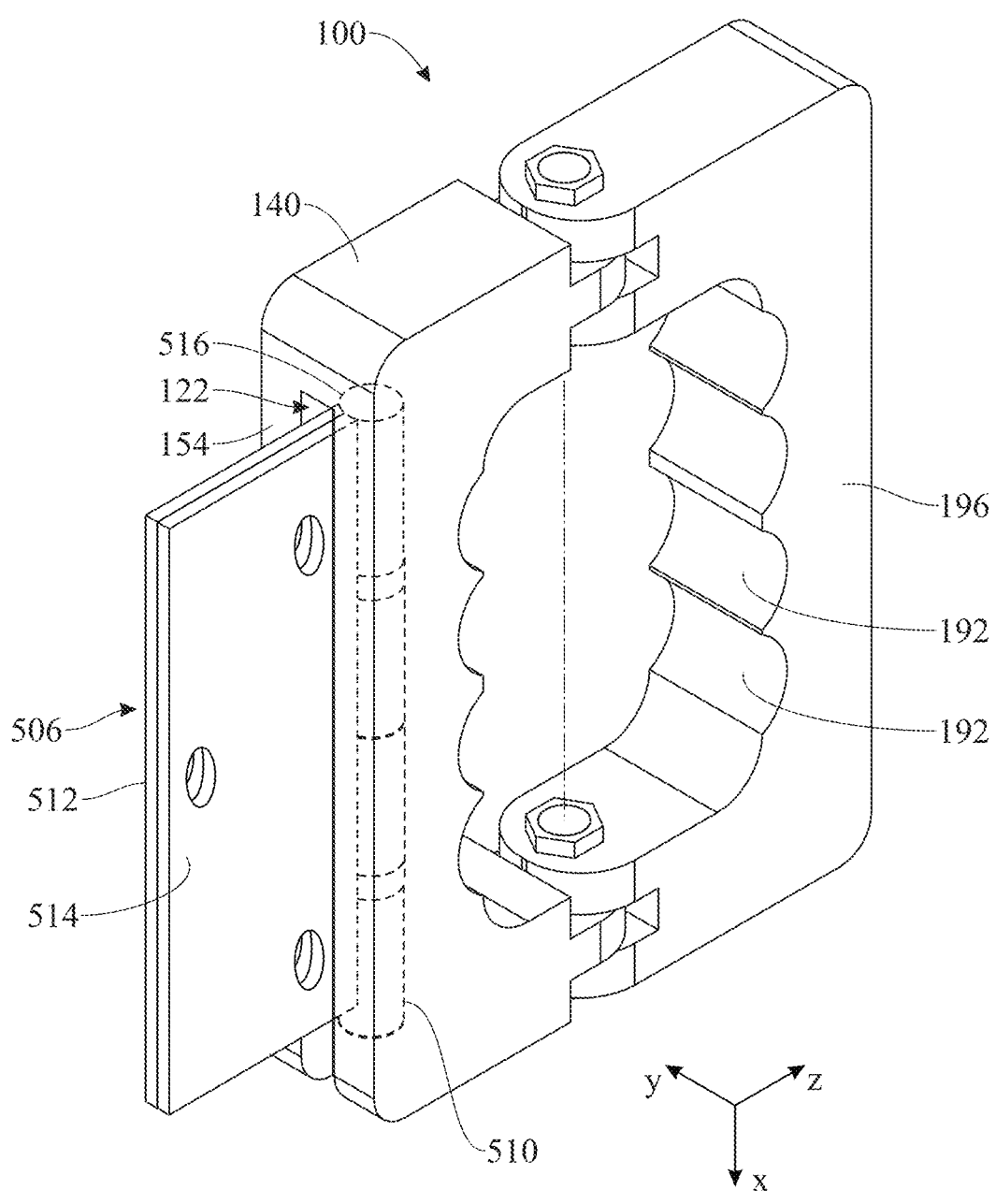
FIG. 6 presents an isometric view of the handle assembly and the hinge of FIG. 5 shown attached.

Referring again to FIG. 6, the hinge 506 may be slid into the hinge-receiving cavity 122 until, for instance, a leading end 516 of the hinge 506 contacts the wall 140 of the first body portion 112. In preferred embodiments, the hinge-receiving cavity 122 may be long enough (i.e. have a sufficient dimension along the longitudinal direction x) to receive the hinge barrel portion 510 in its entirety. Alternatively or additionally, the hinge 506 may be slid into the hinge-receiving cavity 122 until a majority of the hinge barrel portion 510 is received inside the hinge-receiving cavity 122. The wall 140 may prevent the hinge 506 from sliding out of the far end of the handle assembly 100 during operation of the present invention.

Turning to FIG. 7, once the first body portion 112 of each handle assembly 100 has been secured to the corresponding hinge 506, a respective operator 530 may grasp each handle assembly 100, and more specifically, the second grip portion 196 of the second body portion 114 of each handle assembly 100, with their hand 532. Grasping the second grip portion 196 may be facilitated by passing the user's fingers through the space 118 (FIG. 1) of the handle assembly 100, as shown in FIG. 8, and/or seating the fingers into the corresponding finger recesses 192 of the second grip portion 196. The operators 530 may then pull upward on the second grip portion 196 of the handle assembly 100 to lift the structure 500 from the ground.

Turning to FIG. 8, in pulling upward on the second grip portion 196, the second body portion 114 may initially rotate upward with respect to the first body portion 112 about the pivot axis 116, as indicated by arrow B, causing the second body portion 114 to become oriented upward as shown. Once the body portion 114 is oriented upward, a continued upward pulling force on the first grip portion 176 may cause the structure 500 to lift off the ground 540, as shown in FIG. 7.

With continued reference to FIG. 8, the handle assembly 100 may include one or more, and more preferably, a plurality of tightening features which enhance user comfort, and user and hardware safety, while operating the handle assembly 100. For example, as shown in the figure, at least one of, and more preferably, both the first space 130 and the second space 132 of the hinge-receiving cavity 122 may be shaped and sized to relatively snugly receive the barrel portion 510 and the hinge plates 512, 514, respectively, while allowing them to slide therethrough. In another example, the bottom side 152 of the first body portion 112 of the main body 110 of the handle assembly 100 may abut against an outer side 518 of the panel 502 and/or an outer side 520 of the jamb 504, and thereby more solidly secure the first body portion 112 relative to the panel 502; this may minimize or prevent a swaying of the panel 502 relative to the first body portion 112 along a y-z plane and frictionally securing the first body portion 112 in place along the longitudinal direction x thereby contributing to prevent the first body portion 112 from sliding longitudinally off the hinge 506. Alternatively or additionally, the second body portion 114 may abut against the first body portion 112 preventing a further upward pivoting of the second body portion 114 relative to the first body portion 112; for instance, in the depicted example, the left side 188 of the second body portion 114 abuts against the end section 172 of the first body portion 112, and thus said end section 172 blocks a further upward pivoting of the second body portion 114 about pivot axis 116 and thereby minimizes or prevents a swaying of the structure 500 relative to the second body portion 114 pivot about axis 116 (i.e. along a y-z plane).

Referring again to FIG. 7, once the operators 530 have grasped the handle assemblies 100 and lifted the structure 500, the operators 530 may conveniently transport the structure 500 between locations, with the structure 500 suspended from the grasped, handle assemblies 100. Once secured to the hinges 506, the handle assemblies 100 may remain attached to the structure 500 during lifting and transportation. When a desired location is reached, the operators 530 may lower the structure 500 on the ground and release the handle assemblies 100, which may remain attached to the hinges 506 until further use. Alternatively, the handle assemblies 100 may be disconnected from the structure 500 by sliding each handle assembly 100 off of the corresponding hinge 506. The handle assemblies 100 may then be used to transport additional door assemblies 500 by following a similar process. As can be noted, the present invention improves lifting ergonomics and reduces the need to contact or support the structure 500 directly.

In some embodiments, such as the present embodiment, the first and second body portions 112 and 114 may freely pivot about pivot axis 116. This allows the panel 502 to automatically achieve a vertical or approximately vertical position when suspended from the handle assemblies 100 as shown in FIG. 8. However, alternative embodiments are contemplated without departing from the scope of the present disclosure; for instance, a detent, friction hinge, or other positional retention mechanism may be included to maintain the selected angular position between the structure 500 and the second body portion 114 (about pivot axis 116) during use.

Figure 9:
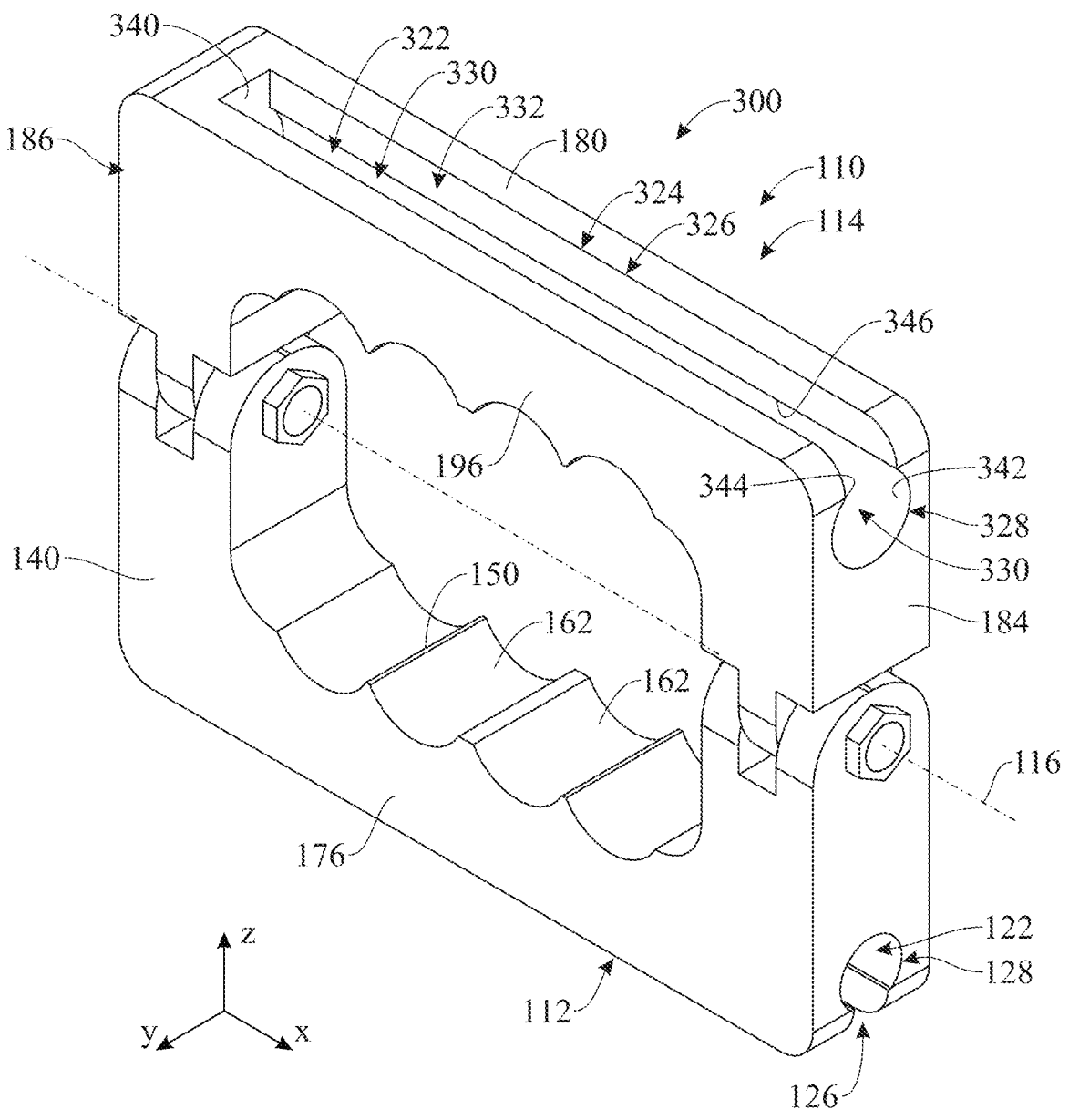
FIG. 9 presents a top front, left side isometric view of a handle assembly in accordance with a second illustrative embodiment of the present invention.

The illustration of FIG. 9 shows a handle assembly 300 in accordance with a further embodiment of the present invention. The handle assembly 300 is constructed generally the same as the handle assembly 100 of FIGS. 1-8, with the exception that the main body 110 of the handle assembly 300 of the present embodiment includes a second hinge-receiving cavity 322. The second hinge-receiving cavity 322 may be shaped and sized differently to the first, hinge-receiving cavity 122, such as to couple with a different hinge shape and/or size. In further embodiments, the handle assembly may include additional hinge-receiving cavities in any area of the main body 110, such as the first body portion 112 and the second body portion 114, to further accommodate different or same hinge sizes and/or shapes.

The second hinge-receiving cavity 322 may be arranged in spaced-apart relationship with respect to the first hinge-receiving cavity 122, such as positioned at an opposite end of the main body 110. For instance, in the present embodiment, with the main body 110 arranged in a non-pivoted configuration about pivot axis 116 such that the first and second body portions 112 and 114 form about 180 degrees, the second hinge-receiving cavity 322 may be located in a vertically opposite position of the main body 110 with respect to the first hinge-receiving cavity 112.

In some embodiments, the second hinge-receiving cavity 322 may be specifically arranged at the second body portion 114. For instance, in the present embodiment, the second hinge-receiving cavity 322 extends along the second grip portion 196 of the second body portion 114. Similarly to the first hinge-receiving cavity 122, the second hinge-receiving cavity 322 may be elongately formed along the longitudinal direction x and may end in an access opening 324. The access opening 324 may be formed by a longitudinal opening 326 and an end opening 328 arranged at an angle with one another and in communication with one another. The end opening 328 may be arranged at a front or first end of the second hinge-receiving cavity 322 along the longitudinal direction x, i.e. at the same side of the main body 110 as the end opening 128 of the first, hinge-receiving cavity 122; in other embodiments, the end opening 328 may instead be located at a rear end of the main body 110 (i.e., at the rear side 186 of the second body portion 114). In preferred embodiments, similarly to the first hinge-receiving cavity 122, an opposite rear or second end of the second hinge-receiving cavity 322 (opposite to the front end at which the end opening 328 is located) may be at least partially closed to prevent the hinge from sliding longitudinally out of the second hinge-receiving cavity 322; for instance, the rear end of the second hinge-receiving cavity 322 of the present embodiment is fully closed by a wall 340 of the second body portion 114.

Also similarly to the first hinge-receiving cavity 122, the second hinge-receiving cavity 322 may include a first space 330 and a second space 332 arranged extending from one another. The end opening 328 may allow access to the first and second spaces 330 and 332, while the longitudinal opening 326 may grant access to the second space 332. The first space 330 may be shaped and sized to slidably receive a barrel portion of a hinge 506. The second space 332, in turn, may be shaped and sized to slidably receive first and second hinge plates, while being sufficiently small (narrow) to prevent the barrel portion of the hinge from passing therethrough. In the depicted example, the first space 330 is generally cylindrical and has a larger width (diameter) than that of the first space 130 of the first hinge-receiving cavity 122, and the second space 332 is generally flat and rectangular and has a larger width than that of the second space 132 of the first hinge-receiving cavity 122; the second hinge-receiving cavity 322 is thus configured to receive and retain a larger hinge than that of the first hinge-receiving cavity 122. An inner wall 342 of the first body portion 112 may define the first and second spaces 330, 332. In the area in which the wider, first space 330 transitions into the narrower, second space 332, the inner wall 342 may include shoulders 344 and 346 arranged in spaced-apart relationship and facing one another; similarly to the shoulders 144, 146 of the first hinge-receiving cavity 122, the shoulders 344, 346 are configured to retain the hinge barrel portion to prevent the hinge from sliding out of the second hinge-receiving cavity 322 through the longitudinal opening 326.

In use, the operators 530 (FIG. 7) may select which hinge-receiving cavity 122, 322 is to be used, in dependence of the specific shape and/or size of the hinges comprised in the structure 500 which is to be transported. Once the adequate hinge-receiving cavity 122, 322 is determined, the operators 530 may mount a selected number of handle assemblies 300 to the hinges by coupling the hinge barrel portions with the selected hinge-receiving cavity 122, 322. Thereafter, operators 530 may hold and transport the structure 500 via the coupled handle assemblies 300 in a manner similar to as was heretofore described with reference to the previous embodiment.

Figure 10:
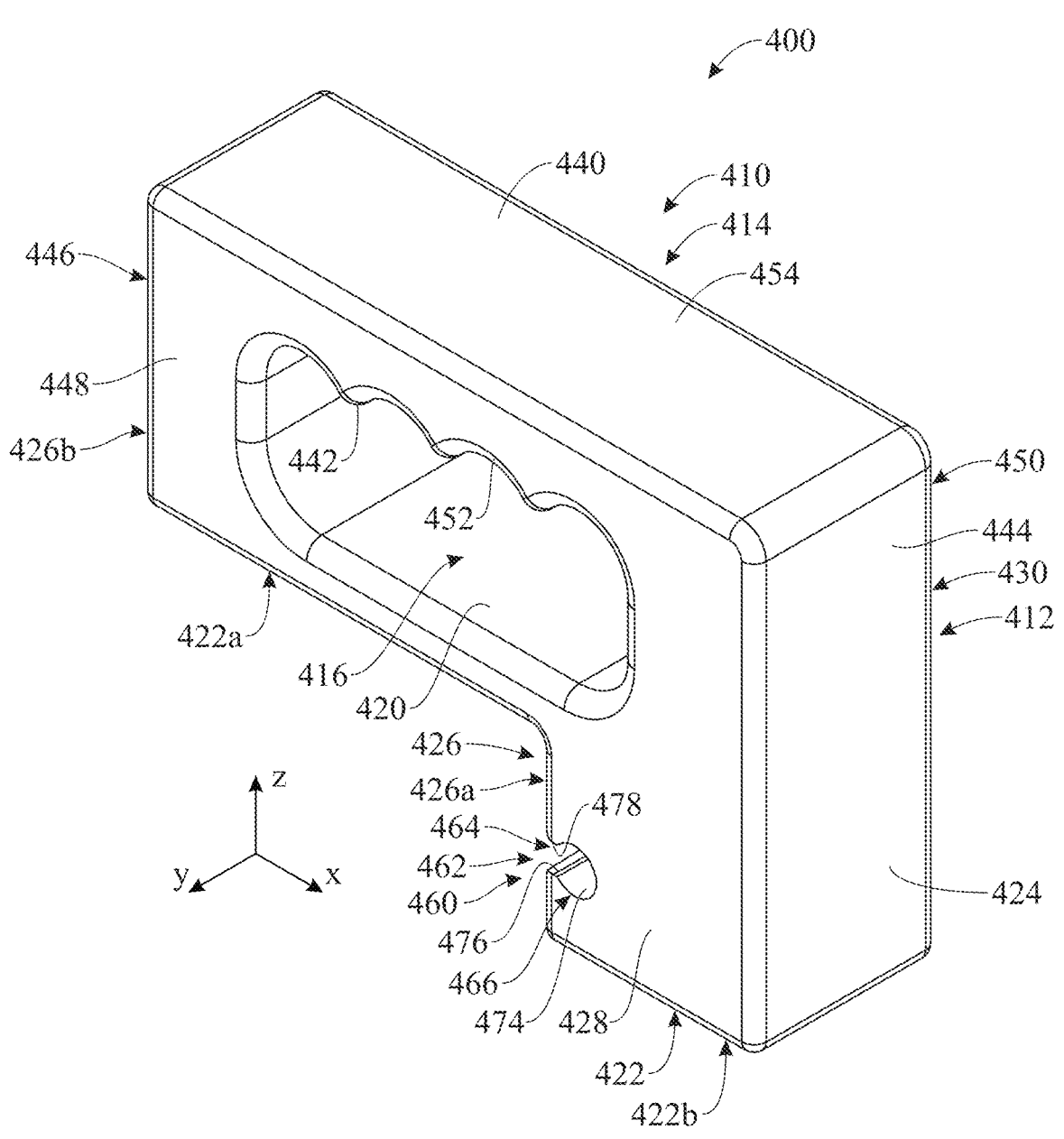
FIG. 10 presents a top front, left side isometric view of a handle assembly in accordance with a third illustrative embodiment of the present invention.
Figure 11:
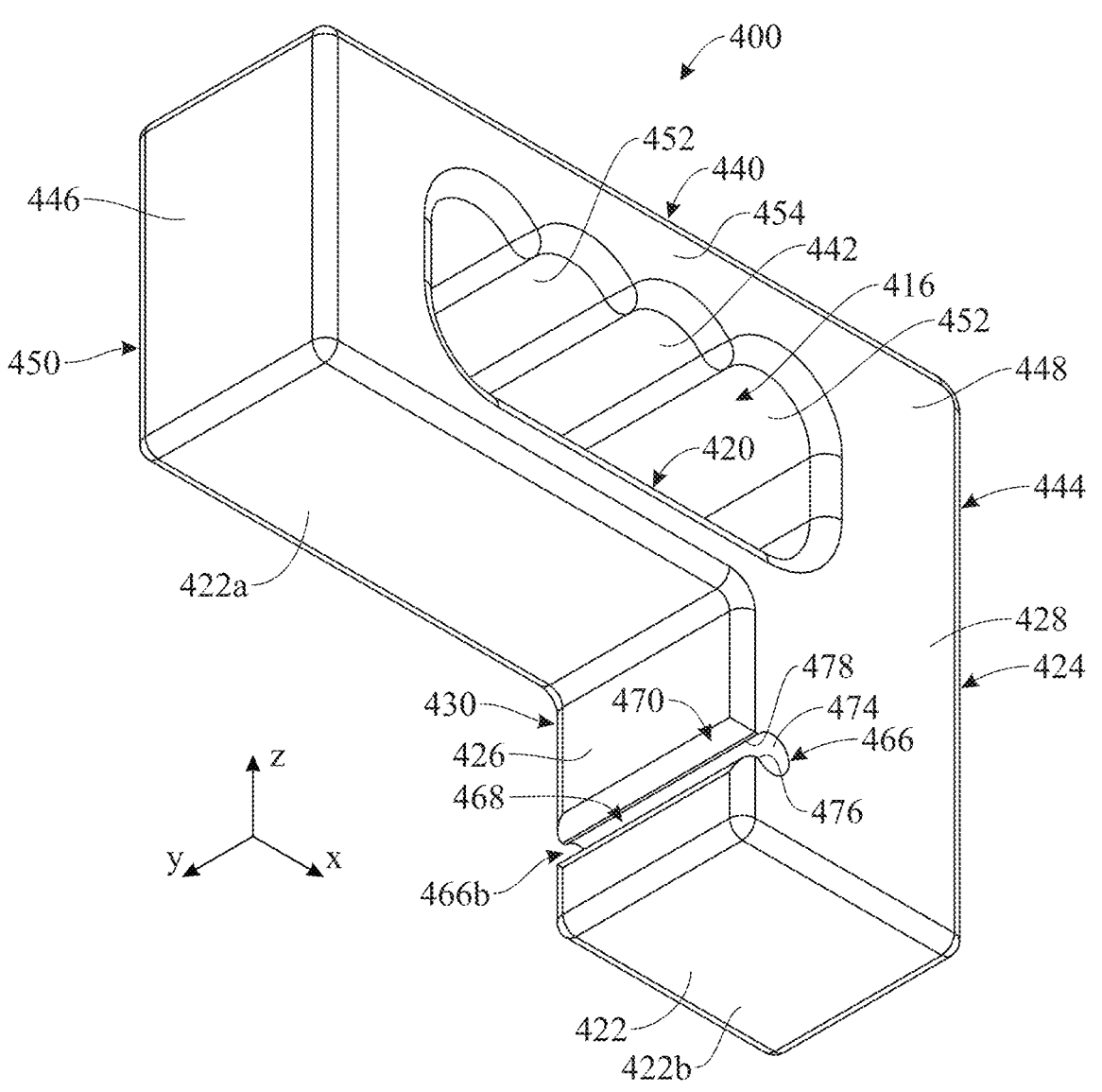
FIG. 11 presents a bottom rear, left side isometric view of the handle assembly of FIG. 10.

The illustrations of FIGS. 10-12 show a handle assembly 400 in accordance with a further embodiment of the present invention. With reference initially to FIGS. 1 and 2, similarly to previous embodiments, the handle assembly 400 includes a main body 410. The main body includes a first body portion 412 and a second body portion 414. The main body 410 defines a space 416 for a user's fingers to pass through. More specifically, the space 416 is located between and defined by the first and second body portions 412 and 414. Unlike the present embodiment, however, the main body 410 is formed into a single-piece unit or monolithic structure, i.e. the first and second body portions 412 and 414 are not formed as separate bodies or parts.

Similarly to the previous embodiments, the first body portion 412 includes a top side 420, a bottom side 422, a front side 424, a rear side 426, a left side 428, and a right side 430 arranged extending from one another. However, the rear side 426 is staggered and includes a first vertical surface 426a and a second vertical surface 426b arranged spaced apart from one another along the longitudinal direction x. Similarly, the bottom side 422 is staggered and includes a first horizontal surface 422a and a second horizontal surface 422b.

Similarly to previous embodiments, the second body portion 414 includes a top side 440, a bottom side 442, a front side 444, a rear side 446, a left side 448 and a right side 450. The front side 444 of the second body portion 414 is coplanar with and arranged in surface continuity with the front side 424 of the first body portion 412. Similarly, the rear side 446 of the second body portion 414 is coplanar with and arranged in surface continuity with the second vertical surface 426b of the rear side 426 of the first body portion 412. In turn, the left and right sides 446 and 448 of the second body portion 414 are coplanar with and arranged in surface continuity with the left and right sides 428 and 430 of the first body portion 412. A top area of the second body portion 414, arranged above the space 416, provides or constitutes a grip portion 454. At the bottom side 442, the second body portion 414 is provided with finger recesses 452 for a user to more ergonomically wrap their fingers around when grasping the grip portion 454 and extending the fingers through the space 416. As with previous embodiments, the grip portion 454 is elongately formed along the longitudinal direction x and the finger recesses 452 may extend in parallel relationship with one another along transverse direction y.

With continued reference to FIGS. 10 and 11, the first body portion 412 includes a hinge-receiving cavity 460, which is constructed having a structure generally the same as the hinge-receiving cavities 122, 322 of the previous embodiments. For example, the hinge-receiving cavity 460 includes an access opening 462 formed by a longitudinal opening 464 and an end opening 466. It should be noted, however, that the access opening 462 of the present embodiment further includes a second end opening 466b opposite to the end opening 466, i.e. the hinge-receiving cavity 460 is open at both ends and allows for the insertion of a hinge 506 (FIG. 12) through either open end or end opening 466, 466b. Similarly to the previous embodiments, the hinge-receiving cavity 460 comprises a first space 468 and a second space 470. The first and second spaces 468 and 470 are accessible through both end openings 466, 466b. An inner wall 474 of the first body portion 412 defines the hinge-receiving cavity 460 and includes a pair of shoulders 476 and 478 configured to retain a hinge barrel portion 510 within the first space 468. Unlike the previous embodiments, however, the hinge-receiving cavity 460 of the present embodiment is perpendicular to the grip portion 454.

In use, one or more handle assemblies 400, and more preferably at least two handle assemblies 400, may be attached to respective hinge(s) comprised in a structure to facilitate manually carrying the structure via the handle assembly or assemblies 400. By way of example, the illustration of FIG. 12 shows a handle assembly 400 secured to a hinge 506 of an illustrative structure 500. In order to secure the handle assembly 400 to the hinge 506, the operator may slide the main body 410 of the handle assembly 400 over the protruding hinge 506 at any one of the end openings 466, 466b and cause the hinge barrel portion 510 and the hinge plates 512, 514 to slide into the hinge-receiving cavity 460.

Once the hinge 506 has been sufficiently slid into the hinge-receiving cavity 506, as shown in FIG. 12, the handle assembly 400 provides a gripping point for a user to grasp and lift the structure 500. In this working configuration of the handle assembly 400, the hinge 506 is transversely retained within the hinge-receiving cavity 460 by the shoulders 476, 478 blocking a transverse sliding of the hinge barrel portion 510 out of the first space 468. Also similarly to previous embodiments, the grip portion 454 is arranged outside and spaced apart from the structure 500 enabling a gripping thereonto by a hand of a user to manually lift the structure 500 via the handle assembly 400. In addition, similarly to previous embodiments, as shown, the grip portion 454 is located above the hinge-receiving cavity 460. In this particular embodiment, however, in being perpendicular to the hinge-receiving cavity 460, the grip portion 454 and the space 416 are positioned transverse with respect to the structure 500 rather than generally parallel to the structure 500, and preferably above the structure 500. Furthermore, in preferred embodiments, the main body 410 of the handle assembly 400 abuts against the structure 500 to stabilize the main body 410 with respect to the structure 500; for instance, the first vertical surface 426a of the rear side 426 of the first body portion 412 may abut against at least one of the outer side 518 of the panel 510 and the outer side 520 of the jamb 504, as shown.

In some embodiments, and with reference to all embodiments disclosed herein, the main body, and more specifically, the first body portion and the second body portion, may be made from a lightweight materials, such as, but not limited to, plastic or aluminum. In embodiments in which the first and second body portions are formed as separate parts, each one of the first body portion and the second body portion may be constructed into a respective, single-piece unit or monolithic part, such as by plastics injection molding, die metal casting, or mechanization. In embodiments in which the main body is formed into a single-piece unit, the main body may be similarly constructed into a monolithic piece by plastics injection molding, die metal casting, or mechanization, for instance and without limitation.

It should be noted that, while not specifically depicted herein, further embodiments are contemplated without departing from the scope of the present disclosure. For instance, features of any one of the described or depicted embodiments may be applicable to the remaining described or depicted embodiments unless expressly indicated otherwise; for example, any one of the depicted embodiments may be instead provided with a different number of grip portions and/or hinge-receiving cavities and/or location and/or orientation of the grip portions and/or the hinge-receiving cavities.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A structure transportation assembly for facilitating carrying a structure, the structure comprising a hinge having a hinge barrel portion and hinge plates, the hinge barrel portion formed along an axial direction, the structure transportation assembly comprising:

a handle assembly including a main body, the main body comprising:

a grip portion, and a hinge-receiving cavity, comprising first and second spaces communicated with one another through a connecting opening and configured to removably, axially slidably receive the hinge barrel portion and part of the hinge plates of the hinge of the structure, respectively, and first and second shoulders arranged at opposite sides of said connecting opening; wherein the structure transportation assembly is configured to adopt a working configuration in which the main body is mounted to the hinge of the structure by the hinge barrel portion and said part of the hinge plates being received within the first and second spaces of the hinge-receiving cavity, respectively, and in which the first and second shoulders are positioned at opposite sides of the hinge, and further in which the hinge is transversely retained within the hinge-receiving cavity by the first and second shoulders blocking a transverse displacement of the hinge barrel portion out of the first space through the connecting opening, and further in which the grip portion is arranged outside and spaced apart from the structure enabling a gripping thereonto by a hand of a user to manually lift the structure via the structure transportation assembly.

2. The structure transportation assembly of claim 1, wherein:

the main body comprises a first body portion and a second body portion, the first and second body portions movable with respect to one another; wherein one of the first and second body portions comprises said hinge-receiving cavity and the other of the first and second body portions comprises said grip portion; and further wherein in the working configuration of the structure transportation assembly, a position of said grip portion relative to said hinge-receiving cavity is adjustable by moving the second body portion relative to the first body portion.

3. The structure transportation assembly of claim 2, wherein the first and second body portions are pivotable with respect to one another about a pivot axis.

4. The structure transportation assembly of claim 3, wherein the hinge-receiving cavity is elongately formed along a longitudinal direction which is parallel to the pivot axis.

5. The structure transportation assembly of claim 1, wherein the main body is integrally-formed into a single-piece unit.

6. The structure transportation assembly of claim 1, wherein the hinge-receiving cavity is elongately formed along a first longitudinal direction which is parallel to a second longitudinal direction along which the grip portion is elongately formed.

7. The structure transportation assembly of claim 1, wherein the hinge-receiving cavity is elongately formed along a first longitudinal direction which is perpendicular to a second longitudinal direction along which the grip portion is elongately formed.

8. The structure transportation assembly of claim 1, wherein the first space is cylindrical.

9. The structure transportation assembly of claim 1, wherein the second space has a width less than a diameter of the first space.

10. A structure transportation assembly comprising:

a structure, comprising a pair of hinges, each hinge having a hinge barrel portion and hinge plates, the hinge barrel portion formed along an axial direction; and a pair of handle assemblies, each handle assembly including a main body, the main body comprising:

a grip portion, a hinge-receiving cavity, comprising first and second spaces communicated with one another along a connecting opening, and first and second shoulders arranged at opposite sides of said connecting opening; wherein each handle assembly of the pair of handle assemblies is disconnectably secured to the structure by the hinge barrel portion and part of the hinge plates of a respective hinge of the pair of hinges being removably and axially, slidably received within the first and second spaces of the hinge-receiving cavity of the main body of said each handle assembly, respectively, the first and second shoulders of said each handle assembly arranged at opposite sides of said respective hinge; wherein said respective hinge is transversely retained within the hinge-receiving cavity of said each handle assembly relative to said axial direction by the first and second shoulders of said each handle assembly blocking a transverse displacement of the hinge barrel portion out of the first space of said each handle assembly through the connecting opening of said each handle assembly; and further wherein the grip portions of said pair of handle assemblies enable a gripping thereonto of a pair of hands to manually lift the structure via the pair of handle assemblies.

11. The structure transportation assembly of claim 10, wherein the grip portion of each handle assembly is located above the hinge-receiving cavity of said each handle assembly.

12. The structure transportation assembly of claim 10, wherein the main body of said each handle assembly abuts against the structure to stabilize said main body of said each handle assembly with respect to the structure.

13. The structure transportation assembly of claim 10, wherein the main body of each handle assembly of the pair of handle assemblies comprises a first body portion and a second body portion, said first and second body portions comprising the hinge-receiving cavity and the grip portion of the main body of said each handle assembly, respectively, and further wherein said first and second body portions of the main body of said each handle assembly are pivotable with respect to one another to vary a position of said grip portion of the main body of said each handle assembly relative to said hinge-receiving cavity of the main body of said each handle assembly.

14. The structure transportation assembly of claim 13, wherein said second body portion is arranged in an upward-pivoted position, and said first body portion blocks said second body portion from pivoting further towards the structure.

15. The structure transportation assembly of claim 13, wherein the structure is suspended downward from the first body portion of the main body of each handle assembly of the pair of handle assemblies, and further wherein the second body portion of the main body of each handle assembly of the pair of handle assemblies is pivoted upward relative to the first body portion such that the grip portion of said second body portion is arranged above the structure.

16. The structure transportation assembly of claim 10, wherein the first space is cylindrical.

17. The structure transportation assembly of claim 10, wherein the second space has a width less than a diameter of the first space.

\* \* \* \* \*